United States Patent [19]

Loveridge

[11] Patent Number: 4,710,023

[45] Date of Patent: Dec. 1, 1987

[54] MEASUREMENT OF CONTACT LENSES

[75] Inventor: Ronald Loveridge, Harrow, United Kingdom

[73] Assignees: Ruxley Holdings Ltd.; Kilfa Limited, both of United Kingdom

[21] Appl. No.: 913,598

[22] Filed: Sep. 29, 1986

Related U.S. Application Data

[63] Continuation of Ser. No. 620,063, Jun. 13, 1984, abandoned.

[30] Foreign Application Priority Data

Jun. 17, 1983 [GB] United Kingdom ............... 8316567

[51] Int. Cl.$^4$ ..................... A45C 11/04; G01B 9/00
[52] U.S. Cl. ..................................... 356/124; 206/5.1; 356/244

[58] Field of Search ................. 356/124, 244; 206/5.1, 206/45.34

[56] References Cited

U.S. PATENT DOCUMENTS 3,369,656  2/1968  Skinner, Jr. ................... 206/5.1 X
4,113,088  9/1978  Binkhorst ....................... 206/45.34
4,415,076  11/1983  Campbell .......................... 356/124
4,623,249  11/1986  Grant ................................ 356/124

Primary Examiner—F. L. Evans
Attorney, Agent, or Firm—Hubbard, Thurman, Turner & Tucker

[57] ABSTRACT

One or more optical parameters of a contact lens can be measured with the lens contained in aqueous fluid sealed in a sachet of optically acceptable plastics film.

9 Claims, 2 Drawing Figures

MEASUREMENT OF CONTACT LENSES

This application is a continuation of application Ser. No. 620,063, filed Jun. 13, 1984, now abandoned.

This invention relates to the measurement of contact lenses.

There are several important parameters of a contact lens in which a practitioner is particularly interested, including back vertex power (BVP), back central optic radius (BCOR), and lens diameter (LD). The need for measurement of these parameters arises at the manufacturing stage, and also after periods of use. Ideally with soft lenses, the parameters have to be measured using a wet cell system so that the lens remains fully hydrated, and to this end there are several modifications available for keratometers.

A keratometer is ordinarily constructed for use in measuring the curves of the cornea, but by inclusion of a 45° reflecting prism or mirror system, and an optically ground base or plastics wet cell with a flat parallel base, it becomes possible to take measurements of a contact lenses submerged in saline in the wet cell.

This modification is widely adopted, and is described for example at page 459, Chapter 30, "The Verification of the Optical Dimensions of the Soft Lens", by J. Chaston in the book "Soft Contact Lens: "Clinical and Applied Technology", published by Cassells in 1978; also in the Feb. 26, 1983, issue of "The Ophthalmic Optician" at page 128; and also at page 100, volume 3, no 3 (July 1980) of the British Contact Lens Association Journal. In general, measurements of contact lenses can thus be made on keratometers or other forms of ophthalmometer.

Care is needed to obtain useful results, and much thought has gone in to the design of suitable wet cells.

Some designs are relatively complicated, as clearly implied in an article by J Chaston and I Fatt published in Issue 1, Volume 9 (1982) of "International Contact Lens Clinic" on page 12. The article states that the only require to fulfill the same function as a wet cell is to have a storage vial which has a reasonably flat base. However, in the ordinary course of events, the glass vials used to store and transport contact lenses do not have a sufficiently flat and optically perfect base for accurate measurements, and so the authors therefore employed a piece of polymethylmethacrylate sheet cemented to a tube of the same material.

In accordance with the present invention, there is provided a method for measurement of one or more optical parameters of a contact lens, wherein the lens under measurement is contained in aqueous fluid sealed in a sachet of optically acceptable plastics film.

The present invention also provides a sachet of optically acceptable plastics film containing an aqueous fluid and a contact lens.

Figure 1:
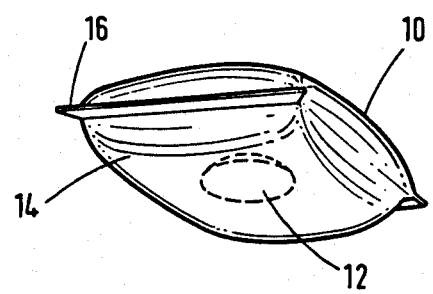
FIG. 1 is an isometric view of a sachet containing a lens in accordance herewith.

Referring to the drawings there is shown a sachet 10 containing a lens 12 immersed in an aqueous fluid 14. The sachet is folded along edge 16 and heat sealed in order to completely encase lens 12.

Figure 2:
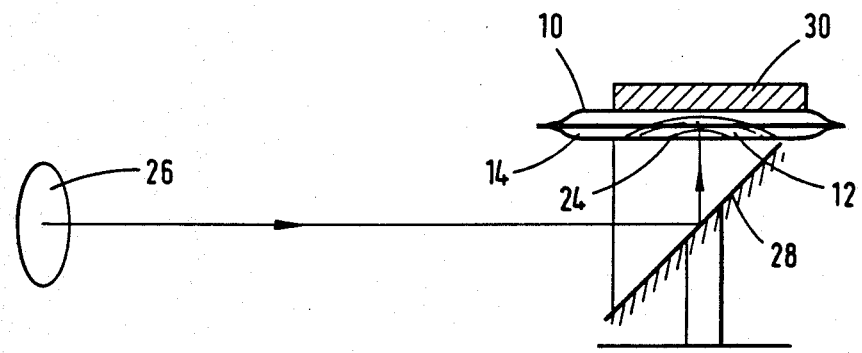
FIG. 2 is a schematic illustration for obtaining optical measurement through the sachet hereof.

In FIG. 2 a Keratometer 26, in cooperation with a reflecting prism or mirror 28 is shown positioned for obtaining optical measurements of lens 12. For these purposes a flat object 30 is positioned overlying the sachet 10.

Sealing of the lens 12 in a sachet 10 not ony permits optical measurements to be made, but leads to other advantages. Thus, the lens 12 can be transported and stored in the sachet 10, and the need for transfer from a glass vial to a wet cell is avoided. Sterility within the sachet can be obtained. Presentation of stock sets of lens can be improved, and it is readily possible to reseal the lens in the sachet following withdrawal for a trial use. Any tonicity and pH variations of the storage solution will be minimised and changing environmental conditions will have little affect, particularly as the sachet can withstand a wide range of temperatures.

In order further to protect the lens 12 and also to help maintain the orientation of the lens within the sachet 10, the lens 12 can be retained in a support or holder 24. Such a support can be made of plastics material and secure the lens to facilitate the taking of the optical measurements.

The preferred material for the sachet 10 is a polyester film such as that available from du Pont under the trade mark Mylar Type M-30. However, investigation will show that other materials can be used, such as pvc laminates, cellophane, polyolefines, and polyesters. The aqueous fluid 14 will usually be sterile saline, and the sachet is best sealed by heat sealing.

It is ordinarily essential for the preferred material that it can be sterilized and withstand the pressures and temperatures for heating in an autoclave (British Pharmacopoeia 1978). The preferred material has a low water vapour property below 20 gms per square meter in 24 hours (A S T M E96 38° C.-90% RH). The preferred material is also capable of achieving a durable and hermetic seal using a suitable process for example, heat sealing. The material thickness is suitably within a range on 5 micron to 100 micron. Furthermore the material used for the sachet 10 is preferably capable of accepting print matter using a suitable process.

In one example in accordance with this invention, a soft lens was heat sealed together with about 1 ml of saline in a rectangular sachet of about 10 cm by 5 cm. Optical measurements were then taken a Zeiss (trade mark) Keratometer 26 modified in the usual way to include a prism 28 and a stage for a wet cell.

In this instance, the sachet 10 was placed on the stage instead of the wet cell, and a flat object 30 lodged on top to flatten out the sachet and to wedge it in position. The lens 12 could readily be maneuvered into position before taking optical readings, and there was no tendency to adhere, as occurs with normal storage vials. Using the available optical formula, there was no difficulty in determining the back vertex power, BVP, from measurements of the back and front optic radius taken on the keratometer. Furthermore, the sachet provided an ideal way of packaging the lens for delivery by conventional methods.

I claim:

1. In a method for measurement of one or more optical parameters of a contact lens, the improvement comprising the step of taking the measurement while the lens is contained in an aqueous fluid in a sealed sachet of plastics film of composition optically compatible with the measurements to be taken.

2. A method according to claim 1, wherein the sachet is of a polyester film

3. A method according to claim 1 wherein the aqueous fluid is sterile saline and the step of taking the measurement includes taking the measurement with a keratometer.

4. A method according to claim 1, wherein the sachet is sealed by heat sealing.

5. A method according to claim 1, wherein the lens is supported or positioned with the aid of a support within the sachet.

6. A method according to claim 1 in which the measurement to be taken is selected from the group consisting of back vertex power, back central optic radius or lens diameter.

7. A sachet of plastics film containing an aqueous fluid and a contact lens, said film and fluid being of compositions optically compatible respectively for taking measurements of optical parameters of said contact lens while contained within said fluid and said film.

8. In a method for optical measurement of one or more optical parameters of a contact lens, the improvement comprising the steps of enclosing the lens to be measured in an aqueous fluid sealed in a sachet of plastics film optically compatible with the measurements to be taken and, with a keratometer positioned exterior of the sachet, measuring the optical parameters of the lens with the keratometer while the lens is contained in the sachet.

9. A method according to claim 8 in which the measurement to be taken is selected from the group consisting of back vertex power, back central optic radius or lens diameter.

* * * * *